(12) United States Patent
Filippova et al.

(10) Patent No.: US 9,087,297 B1
(45) Date of Patent: Jul. 21, 2015

(54) ACCURATE VIDEO CONCEPT RECOGNITION VIA CLASSIFIER COMBINATION

(75) Inventors: Katja Filippova, Zurich (CH); Keith B. Hall, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 632 days.

(21) Appl. No.: 13/316,337

(22) Filed: Dec. 9, 2011

Related U.S. Application Data

(60) Provisional application No. 61/424,485, filed on Dec. 17, 2010.

(51) Int. Cl.
*G06N 3/08* (2006.01)
*G06N 5/02* (2006.01)
*G06F 17/30* (2006.01)

(52) U.S. Cl.
CPC .......... *G06N 5/025* (2013.01); *G06F 17/30781* (2013.01)

(58) Field of Classification Search
CPC ..... G06N 5/025; G06N 7/005; G06N 99/005; G06N 3/08; G06N 3/04; G06K 9/6269; G06K 2009/00711; G06K 9/32; G06K 2009/00738; G06F 17/30707; G06F 17/30781; H04N 21/00
USPC ...................................................... 706/12, 16
See application file for complete search history.

(56) References Cited

U.S. PATENT DOCUMENTS

| | | | |
|---|---|---|---|
| 5,754,681 A | 5/1998 | Watanabe et al. | |
| 5,930,392 A | 7/1999 | Ho | |
| 6,853,982 B2 | 2/2005 | Smith et al. | |
| 6,915,025 B2 | 7/2005 | Wang et al. | |
| 7,024,033 B2 | 4/2006 | Li et al. | |
| 7,039,856 B2 | 5/2006 | Peairs et al. | |
| 7,107,520 B2 | 9/2006 | Gargi | |
| 7,203,669 B2 | 4/2007 | Lienhart et al. | |
| 7,519,217 B2 | 4/2009 | Liu et al. | |
| 7,609,893 B2 | 10/2009 | Luo et al. | |
| 8,015,132 B2 | 9/2011 | Xu | |
| 8,090,621 B1 | 1/2012 | Chakrabarti et al. | |
| 2002/0059221 A1 | 5/2002 | Whitehead et al. | |
| 2006/0031217 A1 | 2/2006 | Smith et al. | |

(Continued)

OTHER PUBLICATIONS

Lin et al. (Lin), "News Video Classification Using SVM-based Multimodal Classifiers and Combination Strategies", 2002.*

(Continued)

*Primary Examiner* — Jeffrey A Gaffin
*Assistant Examiner* — Nathan Brown, Jr.
(74) *Attorney, Agent, or Firm* — Fenwick & West LLP

(57) ABSTRACT

A classifier learning module trains video classifiers associated with a stored set of concepts derived from textual metadata of a plurality of videos. Specifically, a first type of classifier (e.g., a content-based classifier) and a second type of classifier (e.g., a text-based classifier) are trained, the classifiers when applied to a video indicating a likelihood that the video represents one or more concepts corresponding to the classifier. The first type of classifier can be used to determine the training set for the second type of classifier. The learning process does not require any concepts to be known a priori, nor does it require a training set of videos having training labels manually applied by human experts. Scores from the first type of classifier are combined with scores from the second type of classifier to obtain video classification of enhanced accuracy.

17 Claims, 7 Drawing Sheets

(56) References Cited

U.S. PATENT DOCUMENTS

| | | |
|---|---|---|
| 2007/0255755 A1 | 11/2007 | Zhang et al. |
| 2008/0228749 A1 | 9/2008 | Brown |
| 2009/0208106 A1 | 8/2009 | Dunlop et al. |
| 2009/0234886 A1 | 9/2009 | Raghavan |
| 2009/0281970 A1 | 11/2009 | Mika et al. |
| 2009/0292685 A1 | 11/2009 | Liu et al. |
| 2009/0327336 A1 | 12/2009 | King et al. |
| 2010/0125539 A1 | 5/2010 | Aucouturier et al. |
| 2010/0220922 A1 | 9/2010 | Okada |

OTHER PUBLICATIONS

Aradhye, H., et al., "Video2Text: Learning to annotate video content," IEEE International Conference on Data Mining Workshops, Dec. 6, 2009, pp. 144-151.

Belkin, M., et al., "Manifold Regularization: A Geometric Framework for Learning from Labeled and Unlabeled Examples," Journal of Machine Learning Research, 2006, vol. 7, pp. 2399-2434.

Blei, D. M. et al., "Latent Dirichlet Allocation," Journal of Machine Learning Research, 2003, pp. 993-1022, vol. 3.

Blum, A., et al., "Combining Labeled and Unlabeled Data with Co-Training," COLT: Proceedings of the Workshop on Computational Learning Theory, Morgan Kaufmann Publishers, 1998, pp. 92-100.

Cai, C., et al., "Hierarchical clustering of WWW image search results using visual, textual and link information," In Proc. of ACM MM'04, Oct. 10-16, 2004, pp. 952-959.

Cao, L., et al., "Annotating Photo Collections by Label Propagation According to Multiple Similarity Cues," Proceeding of the 16th ACM international conference on Multimedia, 2008, 9 pages.

Carvalho, R., "Metadata goes where Metadata is: contextual networks in the photographic domain," ESWC 2008 Ph. D. Symposium, 2008, 5 pages.

Chang, S-F. et al., "Combining Text and Audio-Visual Features in Video Indexing," ICASSP 2005, IEEEE, 2005, pp. V-1005-V-1008.

Chang, S., et al., "Recent Advances and Challenges of Semantic Image/Video," IEEE International Conference on Acoustics, Speech and Signal Processing, 2007, 4 pages.

Christoudias, C. M., et al., Co-Training with Noisy Perceptual Observations, CVPR, 2009, pp. 1-10.

Cui, F., et al., "Content-enriched classifier for web video classification," In Proc. of SIGIR'10, Jul. 19-23, 2010, pp. 619-626.

Duchenne, O., et al., "Automatic Annotation of Human Actions in Video," ICCV, 2009, 8 pages.

Erosheva, E. et al., "Mixed Membership Models of Scientific Publications," Proceedings of the National Academy of Sciences, 2004, pp. 5220-5227.

Everingham, M., et al., "Hello! My Name is . . . Buffy—Automatic Naming of Characters in TV Video," BMVC, 2006, 10 pages.

Fan, R.-E., et al., "Liblinear: A library for large linear classification," Journal of Machine Learning Research, 2008, vol. 9, pp. 1871-1874.

Feng, H., et al., "A Bootstrapping Framework for Annotating and Retrieving WWW Images," Proc. ACM MM, 2004, 8 pages.

Fischer, S., et al., Automatic recognition of film genres, In Proc. of ACM Multimedia'95, Nov. 5-9, 1995, pp. 295-304.

Gargi, U. et al., "Solving the Label-Resolution Problem in Supervised Video Content Classification," Proc. of ACM Multimedia Information Retrieval, 2008, pp. 276-282.

Gupta, S., et al., "Watch, Listen & Learn: Co-Training on Captioned Images and Videos," Proceedings of the European Conference on Machine Learning and Principles and Practice of Knowledge Discovery in Databases (ECML), 2008, 16 pages.

Hall, K., et al., "MapReduce/Bigtable for distributed optimization," In NIPS 2010 Workshop on Learning on Cores, Clusters and Clouds, 2010, pp. 1-7.

Herring, S.C. et al., "Bridging the Gap: A Genre Analysis of Weblogs," Proceedings of the 37th Annual Hawaii International Conference on System Sciences, Hawaii, Jan. 5-8, 2004, pp. 1-11.

Huang, G., et al., Text-based video content classification for online video- sharing sites. Journal of the American Society for Information Science and Technology, 2010, vol. 61, No. 5, pp. 891-906.

Jones, M. J., et al., "Statistical Color Models with Application to Skin Detection," International Journal of Computer Vision (IJCV), Jan. 2002, vol. 46, No. 1, pp. 81-96.

Kumar, S., et al., "Discriminative Fields for Modeling Spatial Dependencies in Natural Images," Advances in Neural Information Processing Systems (NIPS), 2004, 8 pages.

Lafferty, J., et al., "Conditional Random Fields: Probabilistic Models for Segmenting and Labeling Sequence Data," Proceedings of International Conference on Machine Learning (ICML), 2001, 8 pages.

Laptev, I., et al., "Learning Realistic Human Actions from Movies," Proceedings of the IEEE Conference on Computer Vision and Pattern Recognition (CVPR), 2008, 8 pages.

Leung, T., et al., "Representing and Recognizing the Visual Appearance of Materials Using Three-Dimensional Textons," International Journal of Computer Vision (IJCV), 2001, vol. 43, No. 1, pp. 29-44.

Lin, A., et al., "News video classification using SVM-based multimodal classifiers and combination strategies," In Proc. of ACM Multimedia'02, Dec. 1-6, 2002, pp. 323-326.

Liu, J., "Recognizing Realistic Actions from Videos "in the Wild"," Computer Vision and Pattern Recognition (CVPR), 2009, 1996-2003, 8 pages.

Lowe, D. G., "Distinctive Image Features from Scale-Invariant Keypoints," International Journal of Computer Vision (IJCV), 2004, vol. 60, No. 2, pp. 91-110.

McDonald, R. et al., "Distributed Training Strategies for the Structured Perceptron," Proceedings of Human Language Technologies Conference of the North American Chapter of the Association for Computational Linguistics, Los Angeles, CA, Jun. 1-6, 2010, pp. 456-464.

Mishne, G. et al., "Leave a Reply: An Analysis of Weblog Comments," Proceedings of the 3rd Annual Workshop on the Weblogging Ecosystem, Edinburgh, Scotland, May 23, 2006, 8 pages.

Neapolitan, R. E., "Learning Bayesian Networks," Prentice Hall, Upper Saddle River, NJ, USA, 2003, 703 pages.

Popescu, A.M. et al., "Detecting Controversial Events from Twitter," Proceedings of the ACM 19th Conference on Information and Knowledge Management (CIKM 2010), Toronto, Canada, Oct. 26-30, 2010, pp. 1873-1876.

Ramachandran, C., et al., "VideoMule: A Consensus Learning Approach to Multi-Label Classification from Noisy User-Generated Videos," ACM Multimedia, 2009, 4 pages.

Rodriguez, M., et al., "Automatic Metadata Generation Using Associative Networks," ACM Transactions on Information Systems, Feb. 2009, pp. 7:1-7:20, vol. 27, No. 2, Article 7.

Rowley, H.A. et al., "Large Scale Image-Based Adult-Content Filtering," Proc. of VISAPP, 2006, 7 pages.

Sargin, E. M., et al., "Audiovisual Celebrity Recognition in Unconstrained Web Videos," Proc. ICASSP, 2009, 4 pages.

Schindler, G., et al., "Internet Video Category Recognition," First IEEE Workshop on Internet Vision, CVPR, 2008, 7 pages.

Seirsdorfer, S. et al., "Automatic Video Tagging Using Content Redundancy," SIGIR'09, ACM, Jul. 2009, pp. 395-402.

Smeaton, A. F., et al., "Evaluation Campaigns and TRECVid," Proceedings of the 8th ACM International Workshop on Multimedia Information Retrieval, ACM Press, Oct. 26-27, 2006, pp. 321-330.

Snoek, C. G.M., et al., "Early Versus Late Fusion in Semantic Video Analysis," ACM Multimedia 2005, Nov. 6-11, 2005, Singapore, 4 pages.

Toderici, H., et al., "Finding meaning on YouTube: Tag recommendation and category discovery," In Proc. of IEEE CVPR-10, 2010, 8 Pages.

Viola, P., et al., "Rapid Object Detection Using a Boosted Cascade of Simple Features," Proceedings of IEEE Computer Society Conference on Computer Vision and Pattern Recognition (CVPR), 2001, vol. 1, pp. 511-518.

Yang, J., et al., "Cross-Domain Video Concept Detection Using Adaptive SVMS," Proceedings of the 15th International Conference on Multimedia, Sep. 2007, Augsburg, Bavaria, Germany, 10 pages.

Yang, L., et al., "Multi-Modality Web Video Categorization," Proc. MIR, 2007, ACM Press, pp. 265-274.

Yano, T. et al., "Predicting Response to Political Blog Posts with Topic Models," Proceedings of Human Language Technologies Con-

(56) References Cited

OTHER PUBLICATIONS ference of the North American Chapter of the Association for Computational Linguistics, Boulder, Colorado, May 30-Jun. 5, 2009, pp. 477-485.

Yano, T. et al., "What's Worthy of Comment? Content and Comment Volume in Political Blogs," Proceedings of the 4$^{th}$ International Conference on Weblogs and Social Media, Washington, D.C., May 23-26, 2010, pp. 359-362.

Zanetti, S., et al., "A Walk Through the Web's Video Clips," First IEEE Workshop on Internet Vision, Computer Vision and Pattern Recognition (CVPR08), 2008, 8 pages.

Zhang, H., et al., "Automatic Partitioning of Full-Motion Video," Multimedia Systems, 1993, vol. 1, No. 1, pp. 10-28.

Zhang, D., et al., "Joint categorization of queries and clips for web-based video search," In Proc. of MIR'06, Oct. 26-27, 2006, pp. 193-202.

Zhu, X., et al., "Learning from Labeled and Unlabeled Data with Label Propagation," CMU CALD Tech Report CMU-CALD-02-107, 19 pages.

Zhu, X., "Semi-Supervised Learning Literature Survey," Computer Sciences Technical Report 1530, University of Wisconsin-Madison, 2005, pp. 1-38.

Feng, H., et al., A boot-strapping framework for annotating and retrieving WWW images. In Proc. of ACM MM'04, Oct. 10-16, 2004, pp. 55-62.

Yang, E., et al., "Multi-modality web image categorization," In Proc. of ACM MIR-07, Sep. 28-29, 2007, pp. 265-274.

\* cited by examiner

ACCURATE VIDEO CONCEPT RECOGNITION VIA CLASSIFIER COMBINATION

CROSS REFERENCE TO RELATED APPLICATIONS

This application claims the benefit of U.S. Provisional Application No. 61/424,485, filed on Dec. 17, 2010, which is hereby incorporated by reference.

BACKGROUND

1. Field of Art

The present invention generally relates to the field of digital video, and more specifically, to methods of accurately determining whether a video represents a particular concept.

2. Background of the Invention

Concept labeling of a digital video associates the video with an indicator of a concept that the video or a portion thereof represents, such as "cartoon" or "nature." Automatic concept labeling of videos stored by video hosting services such as YOUTUBE is of great benefit to users of such systems, permitting the users to more effectively determine whether the video would be of interest to them by examining or otherwise using the video's concept labels.

Generally, existing automatic concept labeling approaches require a predefined set of concepts specified by a human expert such as a hierarchical taxonomy of predefined concepts. Using a supervised learning model, the human expert labels selected videos with the concepts, and provides those labeled videos to the system, which then learns the relationships between videos (e.g., video content or metadata) and the concepts. In large corpuses (e.g., tens of millions of videos), such a technique will likely not capture the full richness of the concepts illustrated by the videos. For example, a substantial corpus of user-contributed videos can represent a very large and diverse number of distinct concepts, which continues to change as new videos, reflective of new events in the real world, are introduced. Further, given the diversity of concepts in a large corpus, it is more likely that there will be videos that represent concepts that simply would not appear in a manually-specified taxonomy of concepts.

Some conventional techniques for automatic labeling analyze the user-supplied metadata associated with the videos to perform the concept labeling and depend heavily on the accuracy of the metadata to properly label the videos. Unfortunately, the user-supplied metadata is in many cases incomplete or inaccurate. For example, a user submitting a video might make unintentional errors such as misspellings, or might fail to make the effort to provide much or any descriptive textual metadata. A user submitting a video might also intentionally provide false metadata, e.g. as "spam" to induce other users to view the video. Thus, labeling techniques that uncritically accept the user-provided metadata, without employing measures that take the potential inaccuracy into account, frequently produce poor-quality results.

Further, certain types of concepts tend to be more readily recognized through analysis of a particular type of video feature. For example, whether or not a given video is representative of a "wide screen" concept is more readily recognized by analyzing visual content features than by analyzing textual features, since whether a video is formatted for widescreen display is inherent in the visual content of the video itself, whereas it is unlikely to be specifically mentioned in the textual metadata. Thus, an analysis technique based on one particular type of feature may work well for recognition of many concepts but will likely fail to accurately recognize other types of concepts.

SUMMARY

In one embodiment, a computer implemented method comprises accessing a set of concepts derived from textual metadata of a set of videos and accessing, for each of a plurality of the concepts, a content-based classifier that inputs content features of a video and outputs a score indicating a likelihood that the video represents the corresponding concept. The method further comprises obtaining a set of concept scores by applying, to each video of a plurality of the videos, the content-based classifiers, and identifying, for each concept of a plurality of the concepts, a training set comprising ones of the videos for which the obtained concept scores corresponding to the concept indicate at least a threshold level of likelihood that the videos represent the concept. The method still further comprises deriving, from textual metadata of the videos of the identified training sets, textual features, and training text-based classifiers for the plurality of the concepts, the text-based classifiers taking as input the textual features and outputting concept scores indicating a likelihood that the videos represent the corresponding concepts.

In one embodiment, a computer-readable storage medium stores executable computer program instructions, comprising instructions for obtaining a set of concept scores by applying, to each video of a set of videos, a first classifier for a concept, the first classifier taking as input a first type of feature of the video and outputting a concept score indicating a likelihood that the video represents the corresponding concept. The instructions further comprise instructions for identifying ones of the videos for which the corresponding obtained concept score has at least a threshold value, and instructions for deriving, from the identified ones of the videos, features of a second type different from the first type of features. The instructions still further comprise instructions for training a second classifier for the concept based on the second type of features, the second classifier taking as input the second type of features of a video and outputting a concept score indicating a likelihood that the video represents the corresponding concept.

In one embodiment, a computer system comprises a computer processor and a computer-readable storage medium having executable computer program instructions embodied therein that when executed by the computer processor perform actions. The actions comprise accessing a set of concepts derived from textual metadata of a set of videos and accessing, for each of a plurality of the concepts, a content-based classifier that inputs content features of a video and outputs a score indicating a likelihood that the video represents the corresponding concept. The actions further comprise obtaining a set of concept scores by applying, to each video of a plurality of the videos, the content-based classifiers, and identifying, for each concept of a plurality of the concepts, a training set comprising ones of the videos for which the obtained concept scores corresponding to the concept indicate at least a threshold level of likelihood that the videos represent the concept. The actions still further comprise deriving, from textual metadata of the videos of the identified training sets, textual features, and training text-based classifiers for the plurality of the concepts, the text-based classifiers taking as input the textual features and outputting concept scores indicating a likelihood that the videos represent the corresponding concepts.

In one embodiment, a computer-implemented method comprises accessing a set of concepts derived from textual metadata of a set of videos, identifying, for each of a plurality of the concepts, a first training set of videos based on a presence of the concept within textual metadata of the videos, and training one or more content-based classifiers for the concepts based on content of the videos in the training sets that correspond to the concepts. The method further comprises obtaining a set of scores for each video of a plurality of the videos by applying the trained one or more content-based classifiers to content of the video, each score of the set of scores representing a likelihood that the video represents a corresponding one of the concepts, identifying, for each of a plurality of the concepts, a second training set of videos based on ones of the scores that correspond to the concept, and training one or more text-based classifiers for the concepts based on textual metadata of the videos in the training sets that correspond to the concepts.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
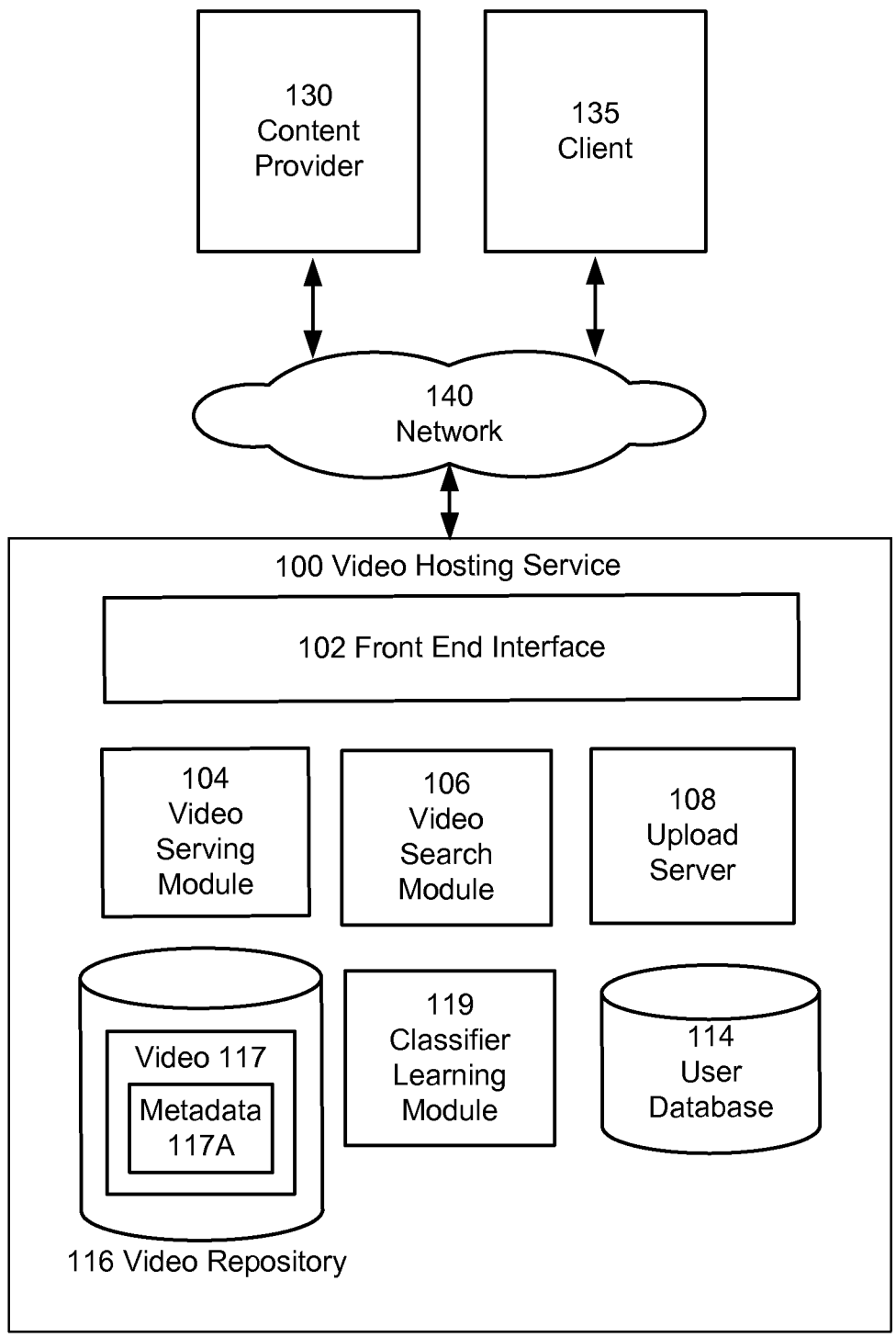
FIG. 1 is a block diagram of a video hosting service in which concept learning and classifier training can be employed, according to one embodiment.

FIG. 1 is a block diagram of a video hosting service 100 in which concept learning and classifier training can be employed, according to one embodiment. The video hosting service 100 represents a system such as that of YOUTUBE that stores and provides videos to clients such as the client device 135. The video hosting service 100 communicates with a plurality of content providers 130 and client devices 135 via a network 140 to facilitate sharing of video content between users. Note that in FIG. 1, for the sake of clarity only one instance of content provider 130 and client 135 is shown, though there could be any number of each. The video hosting service 100 additionally includes a front end interface 102, a video serving module 104, a video search module 106, an upload server 108, a user database 114, and a video repository 116. Other conventional features, such as firewalls, load balancers, authentication servers, application servers, failover servers, site management tools, and so forth are not shown so as to more clearly illustrate the features of the video hosting service 100. One example of a suitable service 100 is the YOUTUBE website, found at www.youtube.com. Other video hosting services are known, as well, and can be adapted to operate according to the teachings disclosed herein. The illustrated components of the video hosting service 100 can be implemented as single or multiple components of software or hardware. In general, functions described in one embodiment as being performed by one component can also be performed by other components in other embodiments, or by a combination of components. Furthermore, functions described in one embodiment as being performed by components of the video hosting service 100 can also be performed by one or more clients 135 in other embodiments if appropriate.

Client devices 135 are computing devices that execute client software, e.g., a web browser or built-in client application, to connect to the front end interface 102 of the video hosting service 100 via a network 140 and to display videos. The client device 135 might be, for example, a personal computer, a personal digital assistant, a cellular, mobile, or smart phone, or a laptop computer.

The network 140 is typically the Internet, but may be any network, including but not limited to a LAN, a MAN, a WAN, a mobile wired or wireless network, a cloud computing network, a private network, or a virtual private network. Client device 135 may comprise a personal computer or other network-capable device such as a personal digital assistant (PDA), a mobile telephone, a pager, a television "set-top box," and the like.

Conceptually, the content provider 130 provides video content to the video hosting service 100 and the client 135 views that content. In practice, content providers may also be content viewers. Additionally, the content provider 130 may be the same entity that operates the video hosting service 100.

The content provider 130 operates a client device to perform various content provider functions. Content provider functions may include, for example, uploading a video file to the video hosting service 100, editing a video file stored by the video hosting service 100, or editing content provider preferences associated with a video file.

The client 135 operates on a device to view video content stored by the video hosting service 100. Client 135 may also be used to configure viewer preferences related to video content. In some embodiments, the client 135 includes an embedded video player such as, for example, the FLASH player from Adobe Systems, Inc. or any other player adapted for the video file formats used in the video hosting service 100. Note that the terms "client" and "content provider" as used herein may refer to software providing client and content providing functionality, to hardware on which the software executes, or to the entities operating the software and/or hardware, as is apparent from the context in which the terms are used.

The upload server 108 of the video hosting service 100 receives video content from a client 135. Received content is stored in the video repository 116. In response to requests from clients 135, a video serving module 104 provides video data from the video repository 116 to the clients 135. Clients 135 may also search for videos of interest stored in the video repository 116 using a video search module 106, such as by entering textual queries containing keywords of interest. Front end interface 102 provides the interface between client 135 and the various components of the video hosting service 100.

In some embodiments, the user database 114 is responsible for maintaining a record of all registered users of the video hosting server 100. Registered users include content providers 130 and/or users who simply view videos on the video hosting service 100. Each content provider 130 and/or individual user registers account information including login name, electronic mail (e-mail) address and password with the video hosting server 100, and is provided with a unique user ID. The user ID can be based on any identifying information, such as the user's IP address, user name, or the like. This account information is stored in the user database 114. Users have the opportunity to specify that the account information not be shared with other components of the video hosting service 100, or with other third-party systems.

The video repository 116 contains a set of videos 117 submitted by users. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, H.264, and the like.

In addition to their audiovisual content, the videos 117 further have associated metadata 117A. In one embodiment, the metadata 117A includes textual metadata such as a video title, a video description, and/or tags provided by a user who uploaded the video, as well as user comments provided by users viewing the video. The metadata 117A may also include an uploader-specified category designating one of a set of categories specified by the video hosting service 100, such as sports, entertainment, music, or the like. Although such textual metadata are typically provided by the video uploader and/or other users, they may also be provided or modified automatically by the video hosting service 100.

The video hosting service 100 further comprises a classifier learning module 119 that trains accurate video classifiers for a set of dynamically discovered concepts. The trained classifiers can then be applied to a given video to determine which of the discovered concepts the video represents. In one embodiment, the classifier learning module 119 first trains a classifier of a first type (e.g., a content-based classifier analyzing video content), and applies that classifier to aid in formation of more accurate training sets for the training of a classifier of a second type (e.g. a text-based classifier analyzing video textual metadata). The classifier learning module 119 is now described in greater detail.

Figure 2:
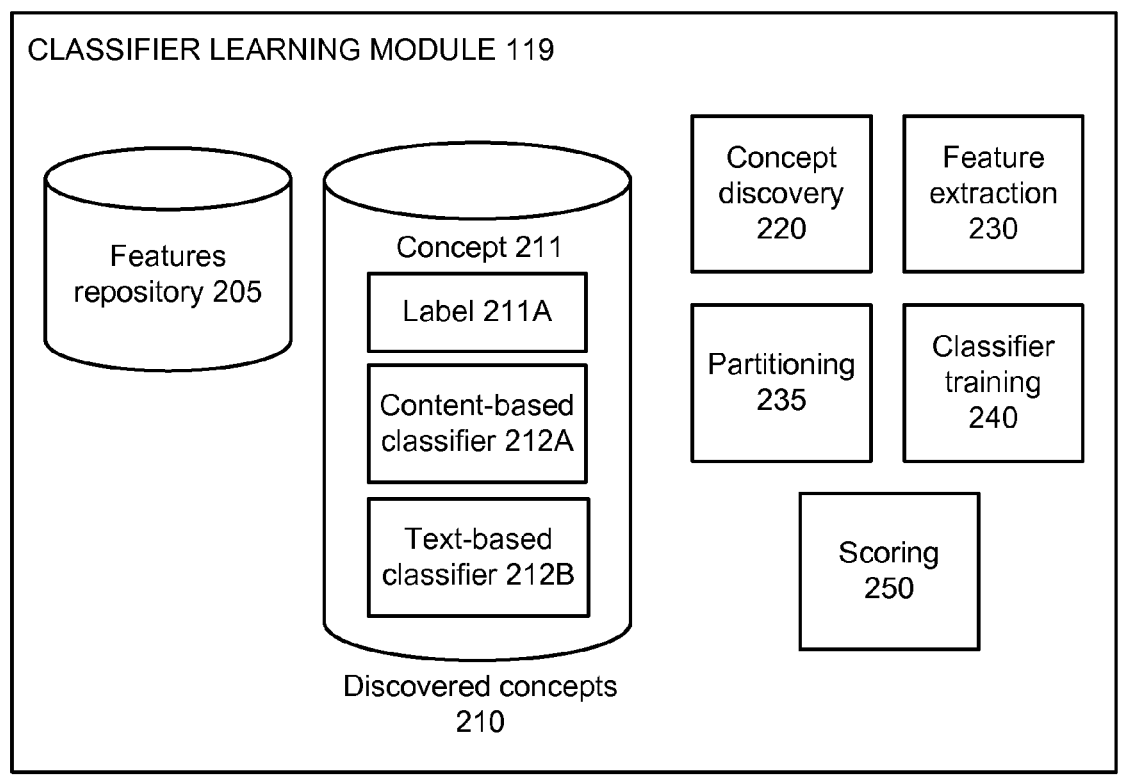
FIG. 2 illustrates the various components of a classifier learning module used in the video hosting service, according to one embodiment.

FIG. 2 illustrates the various components of the classifier learning module 119, according to one embodiment. The classifier learning module 119 comprises various modules to discover concepts to derive different types of features (e.g., content and textual features), to train classifiers for various ones of the concepts, and the like. In one embodiment, the classifier learning module 119 is incorporated into an existing video hosting service 100, such as YOUTUBE. The various components of the classifier learning module 119 are now described in more detail.

The classifier learning module 119 has access to the video repository 116 of the video hosting service 100. The classifier learning module 119 additionally comprises a features repository 205 that stores, for videos of the video repository 116, associated sets of features that characterize the videos with respect to one or more types of information. In one embodiment, the feature types stored in the features repository 205 include content-based features extracted from the content of the videos 117 (e.g., visual content such as color or texture data, and optionally audio data, such as audiograms, MFCC coefficients, or the like) and text-based features extracted from text of the video metadata 117A. Whether content-based or text-based, the features of a video 117 are distinct from the raw content of the video itself and are derived from it by a feature extraction module 230 and (optionally) updated over the course of an iterative training process, as described below. In one embodiment, the features are stored as a vector of values, the vector having the same dimensions for each of the videos 117 for purposes of consistency.

The classifier learning module 119 further comprises a concepts repository 210 that stores the various concepts 211 for which classifiers may be learned. Generally, a concept is a term or phrase that describes some entity, activity, event, place, object, or characteristic that is associated with a video 117. A concept can be associated with a video by having some representation within the video itself, e.g., appearing in the video, or by being present in metadata 117A for the video (e.g., in a user provided description, comments, annotations, or the like). A video can have many different concepts associated with it, but users typically are interested in what may be considered the most salient concept for the video. The label 211A is a unique name for the concept, and in one embodiment is implemented as a text string of N words for some integer N, also referred to as an "n-gram." Some examples of such labels 211A are the strings (or n-grams) "cartoon," "hindi," "telenovela," "naruto shippuden," "english subtitles," "final fantasy," and "music video."

In addition to its label 211A, a concept can have one or more corresponding classifiers 212, and the classifiers may have different types (i.e., analyze different types of video features, such as content or textual metadata). In one embodiment, the classifiers 212 include a classifier 212A trained on content-based features and a classifier 212B trained on text-based features. A classifier 212 for a concept 211 is a function that outputs a score representing a degree to which the features associated with the video indicate that the concept is relevant to the video. Each classifier 212 accepts, as input, video features of the type used to train the classifier. For example, the content-based classifiers 212A accept content-based features, such as color, texture or other data related to visual content, and the text-based classifiers 212B accept text-based features, such as features derived from the title, tags, description, user comments, or other textual features of video metadata 117A. The features are described in more detail below with respect to a feature extraction module 230. Regardless of the type of the classifier, the classifier 212 for a concept outputs a score indicating a likelihood that the video from which the input features were derived represents the concept. The classifier 212 can return different types of scores in different embodiments. For example, in one embodiment the classifier 212 outputs a real number (e.g., a number that is normalized to fall between 0 and 1) indicating a strength of the relevance match between the video and the concept (e.g., number closer to 1 indicating a strong relevance match). In another embodiment, the classifier 212 outputs a Boolean value, e.g., the integer 1, to indicate that the video is relevant to the concept, and a different value, e.g., the integer 0, to indicate that the concept is not relevant.

The classifiers 212 need not be per-concept classifiers, that is, one classifier for each concept 211. Rather, a multi-class classifier can be employed, the multi-class classifier returning a set of scores, one score for each concept. For example, a multi-class classifier can output a probability distribution with a plurality of scores, each score associated with a particular concept, the scores summing to a given value (e.g., 1.0). As used herein, the phrase "training classifiers for concepts" (or "training a classifier for a concept") may refer either to training a separate classifier, one for each concept, or to training a single multi-class classifier simultaneously associated with all of the concepts, or with some subset thereof.

In one embodiment, the classifier learning module 119 also comprises a concept discovery module 220 that identifies potential concepts that can be used to label videos. In one embodiment, the concept discovery module 220 extracts the concepts from the text of the video metadata 117A of the various videos 117 in the video repository 116, or from some subset of the textual metadata, such as the title and tags but not the (typically lengthier) description. More specifically, the concept discovery module 220 analyzes the textual metadata 117A of some of all of the videos 117, collecting a large set of n-grams (i.e., strings having at most n word tokens) occurring in the metadata of any of the videos. For example, for an embodiment in which the concept discovery module 220 collects 4-grams, if the metadata for a particular video comprised a title having the text "Informative video about penguins," the concept discovery module would accordingly identify as potential concepts the strings "Informative video about penguins," "Informative video about", "video about penguins," "Informative video," "video about," "about penguins," "Informative," "video," "about," and "penguins." Concepts could be collected in a similar manner from the description, tags, or other user-supplied textual metadata. In one embodiment, in order to speed up subsequent processing the concept discovery module 220 creates a lookup table mapping a concept to the videos that contain that concept within their metadata. The concept discovery module 220 removes a set of predetermined stopwords unlikely to convey substantive meaning, such as articles and prepositions like "a," "the," and "of," from the list of potential concepts.

In an alternate embodiment, the concept discovery module 220 obtains the set of potential concepts from another source, such as a pre-existing set of terms and phrases (e.g., those provided by WordNet, Freebase, or other ontologies), rather than extracting them from video metadata 117A.

In one embodiment, the concept discovery module 220 purges identified potential concepts that occur too frequently or infrequently in the video metadata 117A, for some predetermined thresholds of frequency, such as a maximum threshold of 100,000 videos, and a minimum threshold of 1,500 videos. For example, the concepts "video" or "funny" are generic and so are likely to occur an extremely large number of times for very different genres of videos. Thus, they would be unlikely to represent a single, distinct type of video and would therefore be purged. Similarly, concepts occurring a very small number of times would not provide enough data to allow learning algorithms to train a useful classifier for the concepts and would likewise be purged.

The video hosting service 100 additionally comprises a feature extraction module 230 that derives features used to compactly characterize a video for purposes of machine learning. The feature extraction module 230 can derive different types of features for use in training different types of classifiers, such as the content-based classifier 212A and the text-based classifier 212B referenced above.

For example, in the case of a content-based classifier 212A, the feature extraction module 230 derives a number of different audiovisual features 205 from the content of the video 117, including features relating to motion rigidity, color and texture, and audio, storing them in association with the video. Specifically, homography transformation error between feature points on two consecutive frames is employed to estimate rigidity of motion. The rigidity of motion feature generates one real number per video corresponding to the fraction of frames in the video deemed to have only rigid motion. Regarding color and textual features, a custom local descriptor collects Gabor wavelet responses at different orientations, spatial scales, and spatial offsets form the interest point; the descriptors are extracted at sparse interest points determined by a Laplacian of Gaussian feature extractor. Bag-of-words histograms are computed, and codebooks are built using hierarchical k-means. The sparse feature histogram is extracted every half second. Once the entire video is processed, the cumulative histogram is converted into a sparse code by discarding bins with less than ten activations (corresponding to five seconds). In addition, an 8×8 Hue-Saturation histogram is computed for each frame. Each bin is then interpreted as a time series. An 8-level 1D Haar wavelet decomposition is employed, and the first two moments and the extremas are computed at each level. This descriptor is then appended to the feature to form the final feature vector, which is a sparse vector of real-valued data that implicitly characterizes object shape, color, and texture along with their temporal variations. Regarding the audio features, a cochlear model of filterbanks that form a Stabilized Auditory Image (SAI) is employed. To compute the SAI a set of band-pass filters is followed by an autocorrelation of each channel, which is then transformed into a sparse code using vector quantization. The end result is a sparse vector of real-valued data that implicitly characterizes several aspects of music and speech of the audio track. Visual features can include complex, high dimensional descriptors, such as SIFT (Scale Invariant Feature Transform), GLOH (Gradient Location and Orientation Histogram), LESH (Local Energy based Shape Histogram), or SURF (Speeded Up Robust Features) features.

In one embodiment, the same set of feature types—e.g., motion rigidity, color and texture, and audio—is extracted for every video. However, different ones of these types of features can be useful for learning different types of videos. For example, the audio features are effective for learning to recognize certain types of videos primarily characterized by their music but are of little use in distinguishing videos based on their visual motion, such as distinguishing cartoon videos from other types of videos. It is appreciated that the particular types of features employed may vary in different embodiments. That is, an embodiment can employ any type of feature that usefully describes properties of videos by which one video can be distinguished from another. The extracted features 205 then serve as a representation of the associated video 117 from which they were extracted for purposes of subsequent learning operations.

In the case of a text-based classifier 212B, the feature extraction module 230 derives textual features from text of video metadata 117A. As previously noted, the video metadata 117A can include a number of different types of text, including the title of the video provided by the uploader (e.g., "Funny penguins"), a description of the video provided by the uploader (e.g., "Penguins strutting around and sliding on the ice"), tags provided by the uploader (e.g., "animal" and "nature"), and comments provided by users (e.g., "Wow, those penguins sure know how to slide! Lol."). A textual version of the designated category (e.g., "Nature") may also be included in the textual features.

Individual words are extracted from portions of the textual metadata 117A of some set of videos. For example, in one embodiment 150,000 videos are selected at random from the videos 117, with the title, description, user tags, category, and user comments being the source of textual features for a video. The extracted words are converted to lowercase, and discarded if they lack sufficient frequency over the analyzed set of videos (e.g., occurrences in at least 10 distinct videos). Then, the resulting set of words acts as the basis for a bit vector for a video, with a bit set to 1 if its corresponding word is present in the textual metadata of the video, and 0 if not. In one embodiment, the textual features include a separate bit vector for each of the sources of the text, e.g., a separate bit vector for each of the title, description, tags, comment, and designated category. Alternatively, a count or weight vector can be employed instead of bit vectors, with each entry of the vector set to the frequency of its corresponding word across the textual metadata of the video. The value of a vector entry may also be a function of the count corresponding count, such as a normalized frequency for user comments formed by dividing the count by a number of user comments. Other statistical co-occurrence analysis approaches—such as tf-idf (term frequency—inverse document frequency, where the "documents" are videos) or chi-squared analysis—are employed in other embodiments.

The user comments constitute an arbitrarily large amount of text and hence can be substantial in size. In one embodiment, the feature extraction module 230 extracts text only from some specific subset of the user comments, such as the most recent 200 comments, rather than from all user comments. In one embodiment, the textual features corresponding to the user comments include an inverted frequency count that divides total frequencies of occurrence of a word in the user comments of a particular video by the frequency of occurrence of the word across user comment sof all videes. This has the effect of diminishing the value for words that occur very frequently, such as "the" or "lol". In general, a user is provided the opportunity to specify that information such as his or her user comments, or any other personal information, may not be collected and/or shared with other components of the video hosting service 100.

Partitioning module 235 partitions the videos 117 into different sets used for performing machine learning. More specifically, in one embodiment the partitioning module 235 divides the videos 117 into distinct training and validation sets globally applicable to all videos, where the training set is used for learning classifiers for different concepts and the validation set is used to test the accuracy of the learned classifiers. In one embodiment in which the discovery of concepts comprises some maximum number of learning iterations, the partitioning module 235 additionally subdivides the validation set into a number of sub-partitions, one for each possible iteration.

Further, the partitioning module 235 defines, for every concept 211, a training set and validation set specifically for that concept, the members of the per-concept training set and validation set being randomly selected subsets of the global training set and validation set, respectively. When training binary classifiers (described further below with respect to the classifier training module 240), the partitioning module 235 also divides the videos of the per-concept training and validation sets into "positive" examples presumed to be representative of the associated concept and "negative" examples presumed not to be representative. The partitioning module 235 can form the positive and negative training sets in different manners in different embodiments, based on the type of classifier 212 being trained and on the classifiers that have already been trained. For example, in one embodiment, when training the content-based classifier 212A the partitioning module 235 identifies a video as belonging to the positive set if the label 211A of the associated concept is located somewhere within its textual metadata—e.g., with each of its words in the same sequential order after the removal of stopwords and whitespace—and to the negative set otherwise. Thus, in this embodiment the positive and negative sets are defined with reference only to the user-defined metadata, without the need for manual labeling by human experts. In one embodiment, the number of negative examples that are identified is three times as many as the positive examples, with negative examples beyond that number being omitted. In short, for each concept there are four sets of videos: a training set and a validation set, each of these sets including one positive example set (textual metadata matching the concept label) and one negative example set (no textual data matching the concept label).

In one embodiment, the content-based classifier 212A is trained before the text-based classifier 212B, and the scores of the content-based classifier are then used to determine the training sets when training the text-based classifiers. Specifically, the content-based classifier 212A for each concept 211 is applied to each of the videos 117 (or to some subset thereof), thereby producing a set of scores, one per concept. For any score over some threshold (e.g., a score of 0.85 on a scale from 0 to 1), the associated video is added to the (positive) training set for the corresponding concept. In one embodiment, only positive, and not negative, examples are identified.

The classifier learning module 119 additionally comprises a classifier training module 240 that trains the classifiers 212 for the concepts 211 based on the training set identified for a concept by the partitioning module 235. The training can differ based on the type of classifier 212 that is being trained. For example, in one embodiment the classifier training module 240 initially trains a set of binary content-based classifiers 212A, one binary classifier per concept 211, in an iterative manner, gradually learning classifiers for additional concepts in subsequent iterations. The classifier training module 240 then trains a single multi-class text-based classifier 212B using the scores produced for each of the concepts by the content-based classifier 212A. These training operations are described in more detail below.

More specifically, at a given iteration the classifier training module 240 attempts to learn the content-based classifier 212A for each concept 211 by applying an ensemble learning algorithm to the derived features 205 of the videos 117 in the training set for the concept. In one embodiment, the ensemble learning algorithm employed is AdaBoost, with a number of stumps linearly proportional to the number of videos in the positive training set. Other learning algorithms, such as Linear Support Vector Machine (SVC), the details of which are known to those of skill in the art of machine learning, could likewise be used.

The classifier training module 240 evaluates the accuracy of each trained content-based classifier 212A by applying the content-based classifier to the videos of the validation set defined for the concept associated with the classifier, and by determining whether the resulting classification is accurate. Specifically, the classifier 212A for a concept is applied to each video in the validation set for the concept, producing some score indicating whether the video matches the associated concept.

If the score produced by the content-based classifier 212A is not already Boolean—directly indicating whether or not the video matches the concept—it may be mapped to a Boolean value. For example, in embodiments in which the content-based classifiers 212A produce real number scores indicating a degree of match strength, the real numbers can be compared to some predetermined threshold, such as 0.94 on a scale of 0.0 to 1.0, to determine whether the similarity is sufficiently strong to constitute a match, with numbers greater than the threshold indicating a match, and lesser numbers indicating a failure to match. If the classifier produces a score indicating that a positive example of the training set represents the concept, the classification is considered a true positive classification (TP). Similarly, a score indicating that a video from the negative examples represents the concept is considered a false positive (FP), a score indicating that a video from the positive examples does not represent the concept is considered a false negative (FN), and a score indicating that a video from the negative examples does not represent the concept is considered a true negative (TN).

The classifier training module 240 retains a trained content-based classifier 212A for a given concept—that is, considers its associated concept to be recognizable—only if the scores produced by the classifier indicate sufficient accuracy. In one embodiment, the accuracy is considered sufficient only if the precision and recall of the classifier are both above predetermined values, such as 0.7, where the precision P is defined as P=TP/(TP+FP), and the recall R is defined as R=TP/(TP+FN). In another embodiment, the accuracy is considered sufficient only if an F-score is above some predetermined threshold (e.g., 0.7), where the F-score F is defined as a function of the precision and recall, F=2PR/(P+R).

As a simple example, assume that the concept discovery module 220 had identified a concept C and trained a corresponding content-based classifier c. Then for given videos $V_1$ to $V_5$ in the validation set for C, the classifier training module 240 might produce a set of corresponding scores 0.8, 0.1, 0.35, 0.6, and 0.9. Assuming that $V_1$, $V_4$, and $V_5$ were in the positive subset of the validation set, and $V_2$ and $V_3$ were in the negative subset, and that 0.8 were the minimum score to indicate a match, the classifier training module 240 might calculate results as follows:

| Video | Score | Set | Mapped | Type |
|---|---|---|---|---|
| $V_1$ | 0.8 | Pos | 1 | TP |
| $V_2$ | 0.1 | Neg | 0 | TN |
| $V_3$ | 0.35 | Neg | 0 | TN |
| $V_4$ | 0.6 | Pos | 0 | FP |
| $V_5$ | 0.9 | Pos | 1 | TP |

That is, the score 0.8 for video $V_1$ would be mapped to 1 (indicating a match), since it is at least as large as the threshold for a match, and would represent a true positive (TP) since it came from the positive validation subset for concept C. Similarly, the score of 0.35 for video $V_3$ is less than the threshold and would thus be mapped to 0 (indicating no match), and would represent a true negative (TN) since it came from the negative validation subset for C.

In order to train content-based classifiers 212A for additional concepts in later iterations, where the classifiers could not be trained with sufficient accuracy in prior iterations, the classifier training module 240 updates the features associated with a video 117 based on the trained classifiers 212. Specifically, if at a given iteration the classifier training module 240 has trained content-based classifiers 212A for some set of concepts for which classifiers had not previously been trained (and has retained them as being sufficiently accurate), then each of these newly-trained classifiers is applied to each video 117 in the video repository. This produces a set of scores for each video 117, one for each newly-learned content-based classifier 212A. These scores are then added as new features to the existing features 205 for a video. For example, in one embodiment the scores are appended to a feature vector for a video, thereby increasing the number of dimensions of the feature vector. For consistency, the order of the scores as appended to the videos 117 is consistent across the videos. Thus, new feature information is effectively added to the feature information 205 already associated with a video 117, and this information can be used to enhance classifier training at the next iteration. Similarly, in embodiments in which an existing (retained) classifier is re-trained at a subsequent iteration, the scores associated with that re-trained classifier are substituted for the corresponding scores obtained from the existing version of the classifier and added to the features 205.

In one embodiment, the classifier training module 240 trains the text-based classifier 212B in a manner different from that used to train the content-based classifier 212A. For example, the data used to train the text-based classifier 212B includes textual features derived from the textual metadata 117A of the videos 117, as described above with respect to the feature extraction module 230, rather than content features. Further, the classifier training module 240 can train the text-based classifier 212B as a multi-class conditional maximum entropy classifier using multinomial logistic regression. Specifically, the classifier is trained to minimize an L1-regularized loss over the training data (namely, the prediction scores produced by the content-based classifiers 212A for each concept), the loss being the negative log-likelihood of the training data. The optimization objective function for training the model parameters that constitute the multi-class classifier is thus:

$$\theta^* = \arg_\theta \min \|\theta\|_1 - \Sigma_i \log p_\theta(c_i | x_i)$$

where $\theta$ is the model parameters, $p_\theta$ is the probability mass function as estimated with $\theta$ (e.g., a log-linear model), $x_i$ is the $i^{th}$ video in the training set (or, equivalently, its corresponding feature vector), $c_i$ is the concept assigned to the $i^{th}$ video, and $\|\theta\|$ is the L1-norm of $\theta$.

In order to accommodate a large training set, a distributed training algorithm is employed, the algorithm performing stochastic gradient descent in parallel on subsets of the data, averaging the trained models after each iteration of training, and then broadcasting the averaged models back to the parallel training processes.

When trained using multinomial logistic regression, the text-based classifier 212B produces, as output for a given video, a probability distribution having a set of scores, one per category, normalized so as to sum to 1.0. Thus, in this embodiment there is not a text-based classifier for every concept, but rather a single multi-class text-based classifier outputting a set of scores for each concept.

The classifier learning module 119 further comprises a scoring module 250 that produces a score for a video based on multiple ones of the classifiers. For example, in one embodiment the scoring module 250 combines the scores of the content-based classifier 212A and the text-based classifier 212B for a video when arriving at the video's combined score. Because different types of classifiers have differing degrees of ability to recognize certain types of concepts in videos, combining the scores from different types of classifiers tends to increase the resulting accuracy. For example, content-based classifiers 212A tend have greater accuracy for identifying the "wide screen" concept than do the text-based classifiers 212B. As another example, text-based classifiers tend to have greater accuracy than content-based classifiers for videos where the content features are representative of multiple concepts, such as videos displaying a green field with players, which could be indicative of sports (e.g., soccer), a video game, or a simulation.

The scoring module 250 converts the scores of the classifiers 212 to be compatible, adjusting the values as needed, and combines them by forming a score product for each concept 211. Specifically, the scoring module 250 provides the content-based features of a video to be scored to each of the content-based classifiers 212A (one per concept 211), each producing a score in the range [0.0, 1.0]. The scoring module 250 also provides the text-based features of the video to the text-based classifier 212B, producing a probability distribution over the concepts. To make the scores of the content-based classifiers 212A and of text-based classier 212B compatible, the scoring module 250 normalizes the individual scores of the content-based classifier 212A and creates a distribution over the concepts 211. The scoring module 250 then computes, for each concept 211, the product of the probability scores for that concept from the content-based classifier 212A and the text-based classifier 212B, respectively. This product then serves as the combined score for a video.

In one embodiment, prior to the normalization the scoring module 250 additionally reduces the value of each score by some value (e.g., 0.5) representing a score of minimum reliability. The storing module then clamps the resulting score to the resulting truncated range (e.g., the range [0.0, 0.5])—that is, converts any resulting score less than 0.0 to 0.0. This reflects the fact that scores below a certain threshold have low reliability. Scores below the reliability threshold (e.g., 0.5) thus become 0.0 and hence the combined score product is also 0.0.

Creating a combined score increases recognition precision because it takes into account scores produced by classifiers trained on different types of features. Since the combination of the scores (e.g., their product) results in a low score where either of the classifier scores is low, this effectively means that a classifier producing a low score has the ability to "veto" the higher score of another classifier. Thus, the only way of obtaining a high compound score is for both classifiers to produce high scores. Hence, a video scoring highly for a given concept video must have been classified as representing that concept with high likelihood by different types of classifiers. This greatly reduces the number of false positives and hence provides a high degree of confidence.

The combination of the various types of classifiers (e.g., the content-based classifier 212A and the text-based classifier 212B) is referred to hereinafter as a "compound classifier." For example, the compound classifier for a particular concept is the result of combining the scores for that concept as output by the content based classifier 212A and by text-based classifier 212B in the manner described above.

The foregoing has described one particular embodiment in which two classifiers 212 are trained: a content-based classifier 212A and a text-based classifier 212B, the former having a separate classifier for each of the concepts 211 and being trained using an ensemble learning algorithm, and the latter being trained after the former and having a single multi-class classifier for all the concepts, the classifier being trained using logistic regression. It is appreciated that many variations of this particular example are possible in other embodiments. For example, the classifiers 212 of the first type and the second type need not be based on content and text, respectively, but could be based on other types of features characterizing a video. Similarly, the classifiers need not be learned in the particular order given (i.e., content-based classifier before text-based classifier). Further, the training of one type of classifier need not depend upon the preexistence of a prior type of classifier used to form positive and negative training sets: rather, the different classifiers 212 could be learned independently of one another. Still further, there need not be exactly two different types of classifiers 212; rather, there could be three or more.

Further, the classifier learning module 119 need not perform all of the operations itself, but rather may rely on other systems (or individuals) to perform certain ones the operations and to provide the results. For example, some other system could perform the actions of the concept discovery module 220, identifying concept phrases for which classifiers can be learned. In one embodiment, for example, the classifier learning module 119 begins with a set of concepts 211 and a corresponding set of content-based classifiers 212A produced by some other system, and uses the above-described techniques to train the text-based classifier 212B based on the concepts and on the content-based classifiers.

The flow of data and processing operations of the above-described modules of the classifier learning module 119 are now described.

Data Flow of Classifier Training

Figure 3:
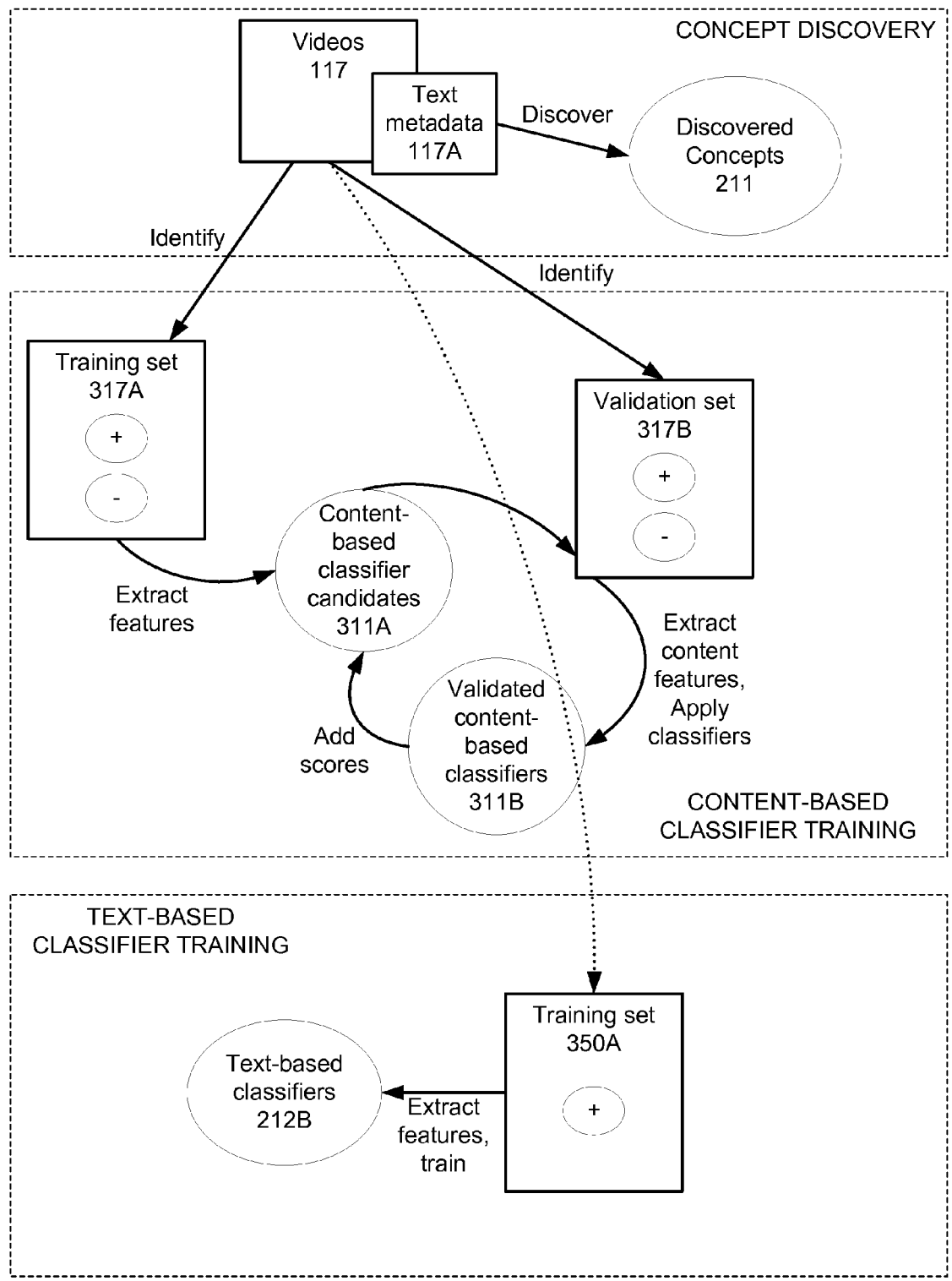
FIG. 3 is a data flow diagram representing the interactions of the various types of data analyzed and/or produced by the classifier learning module, according to one embodiment.

FIG. 3 is a data flow diagram representing the interactions of the various types of data analyzed and/or produced by the classifier learning module 119, according to one embodiment in which all the operations described above with respect to FIG. 2 are performed by the classifier learning module.

Given the videos 117 and their associated textual metadata 117A, the concept discovery module 220 discovers the set of concepts 211 by extracting n-grams (concepts) from the metadata. Further, the partitioning module 235 identifies, for each of the discovered concepts 211, a training set 317A and a validation set 317B that are subsets of the videos 117, as well as establishing a positive and a negative set of examples from within each. The training sets 317 are used to train the content-based classifiers 212A.

The feature extraction module 230 extracts content features from the training set 317A, and at each iteration the classifier training module 240 uses these features to train a content-based classifier candidate 311A for each of the discovered concepts 211. Similarly, the feature extraction module 230 extracts content features from the validation set 317B, and at each iteration the classifier training module 240 applies the content-based classifier candidates 311A to these features to obtain a set of scores. The classifier training module 240 uses these scores to identify a set of validated classifiers 311B that are sufficiently accurate in recognizing whether or not videos represent the concepts associated with the classifiers. The feature update module 245 then adds the scores generated by the newly validated classifiers 311B to the features already associated with the videos in the training set 317A and the validation set 317B. Using these new scores, in addition to the features extracted from the training set 317A and any scores from prior iterations, the classifier training module 240 trains new content-based classifier candidates 311A in the next iteration.

At the end of the process, the validated classifiers 311B serve as the content-based classifiers 212A of FIG. 2. The content-based classifiers 212A are then applied to form training sets for training of the text-based classifiers 212B. Specifically, some or all of the videos 117 are scored using the content-based classifiers 212A, and those videos scoring highly for a particular concept are placed in the set of positive examples of a training set 350A for that concept. A validation set (not depicted) may also be employed, with positive examples determined in like manner. Textual features are then extracted from the training set by the feature extraction module 230, and the text-based classifiers 212B are trained by the classifier training module 240, e.g., using maximum entropy or some other logistic regression algorithm.

Figure 4A:
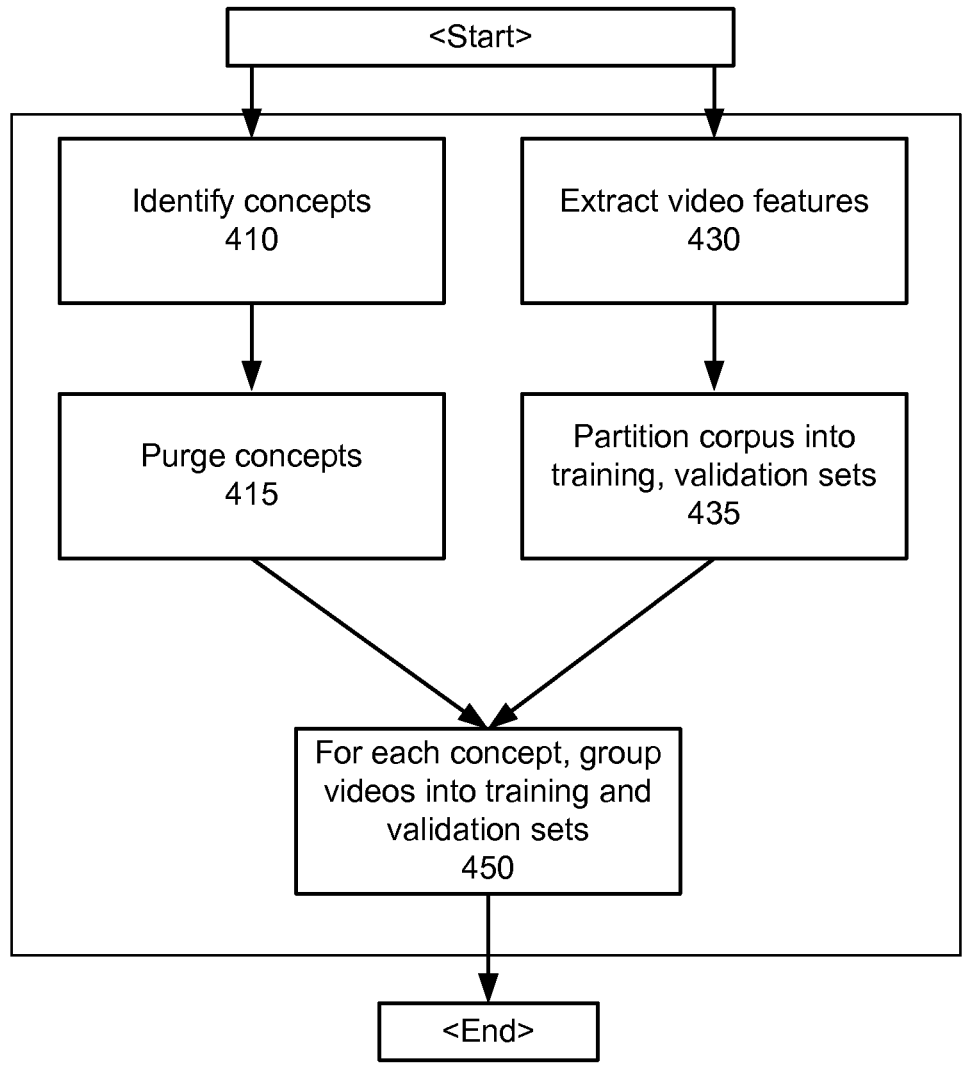
FIG. 4A is a flowchart illustrating data preparation operations performed by the classifier learning module preparatory to performing training, according to one embodiment.
Figure 4B:
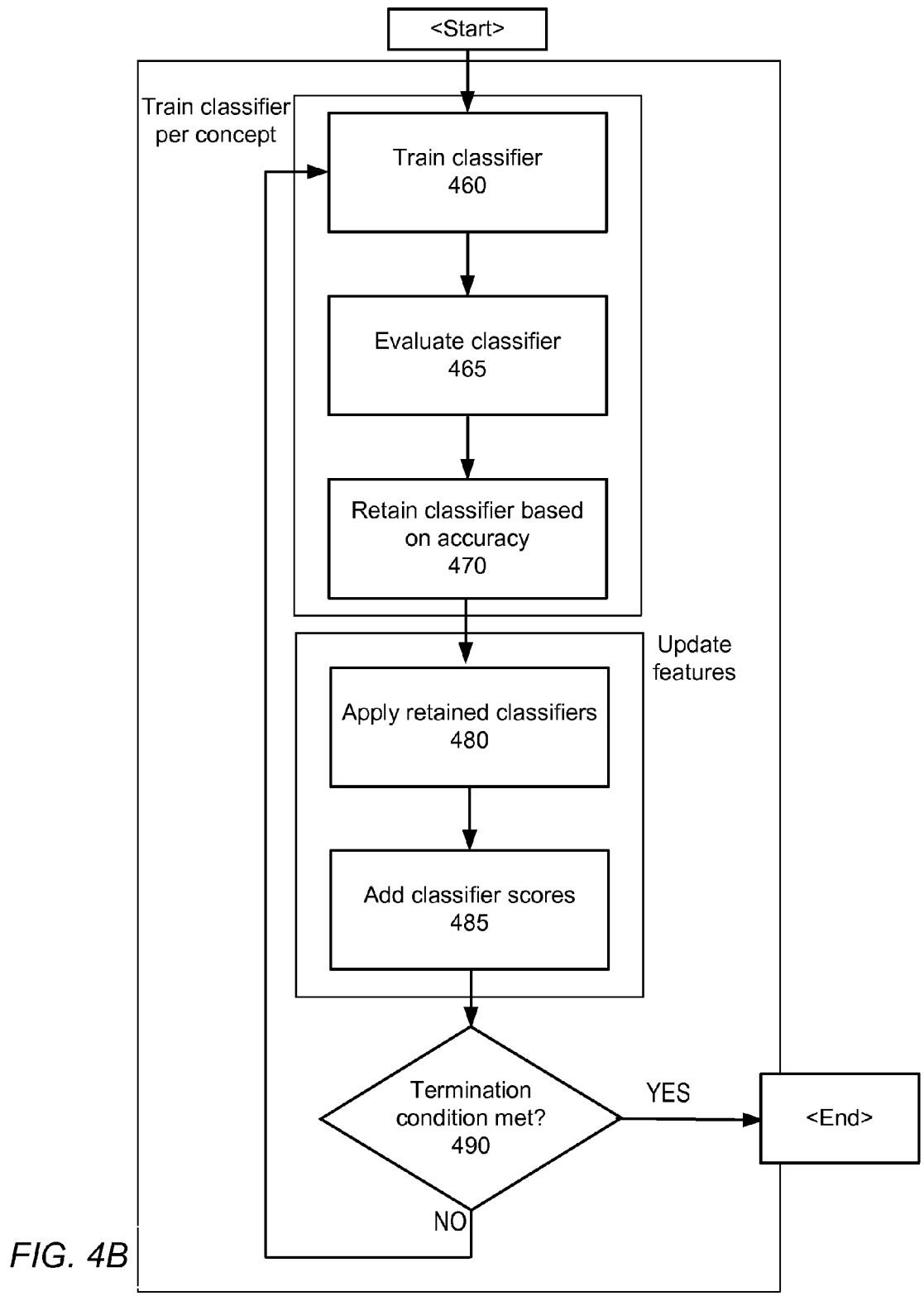
FIG. 4B is a flowchart illustrating classifier learning operations performed by a classifier learning module, according to one embodiment.
Figure 4C:
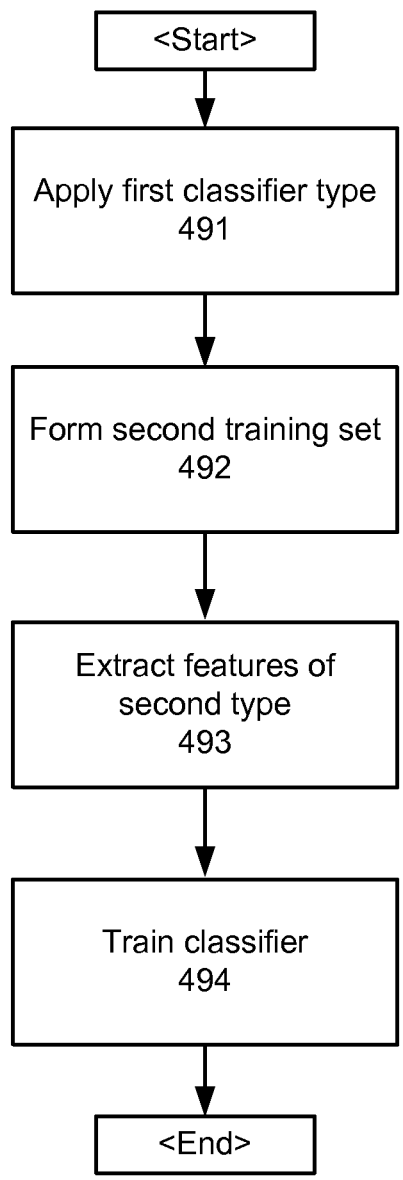
FIG. 4C is a flowchart illustrating the training of a second classifier type using a first classifier type, according to one embodiment.

The operations of the various sub-modules of the classifier learning module 119 are now alternatively illustrated using the flowcharts of FIGS. 4A-4C.

Process of Iterative Unsupervised Classifier Learning

FIG. 4A is a flowchart illustrating in more detail the data preparation operations performed by the classifier learning module 119 preparatory to performing training, according to one embodiment. Data preparation broadly comprises obtaining concepts from video metadata 117A and processing and partitioning the videos 117 to produce the input data from which content-based classifiers 212A are learned.

Concepts are identified 410 within the metadata 117A of the various videos 117 by identifying the various n-grams in the metadata. The concepts less likely to be useful, such as concepts occurring very frequently or very infrequently, are purged 415. These operations are described above in more detail with respect to the concept discovery module 220, above. The result is the set of concept labels 211A of FIG. 2, each label representing a concept. A concept label 211A will be an n-gram, varying from a uni-gram to the maximum of value N (e.g., N=4 for a four-gram).

Independent of the concept discovery, content-based features are extracted 430 from each the videos 117, as described above with respect to the feature extraction module 230. As noted, the content-based features can be of different types that characterize the video according to different classes of properties, such as features characterizing the motion, color and/or texture, and audio properties of a video. The content-based features 205 are then associated with the video 117 from which they were derived. Features 205 can be represented by high dimensional feature vectors. Dimensionality reduction methods (e.g., principal component analysis, locality sensitivity hashing) may also be used to reduce the vectors to a more compact representation making for more efficient processing.

The videos 117 of the video corpus 105 (or more specifically, the content-based feature vectors 205 that represent them) are partitioned 435 into training and validation sets, as described above with respect to the partitioning module 235. In one embodiment, this results in one global training set and one global validation set, the validation set being further subdivided into M disjoint subsets for some integer M, one for each of the possible iterations.

For each of the concepts discovered as a result of steps 410-415, the videos 117 are further grouped 450 into training and validation sets, as further described above with respect to the partitioning module 235. Further, positive and negative video examples are identified for each concept based on whether the concept label 211A appears in the metadata of the various videos.

Using the resulting per-concept training and validation sets (including the positive and negative examples) and the per-video derived features, content-based classifier learning can then take place.

FIG. 4B is a flowchart illustrating classifier learning operations performed by the classifier learning module 119 when training the content-based classifiers 212A based on this prepared data, according to one embodiment. Initially, none of the concepts 211 has a trained content-based classifier 212A (i.e., all classifiers start out in an uninitialized condition), and the content-based features 205 of the videos 117 include only the content-based features initially identified by the feature extraction module 230 before the learning process began. The learning operations of FIG. 4B proceed to learn content-based classifiers 212A iteratively, with the classifiers learned in one iteration providing additional features (i.e., scores) that are useful for training the remaining untrained classifiers in the next iteration. The added information of the classifier scores thus permits training the remaining classifiers for additional concepts that could not be reliably learned at prior iterations, thus allowing gradual learning of more complex concepts (e.g., of abstract concepts).

More specifically, in a given iteration content-based classifiers 212A are trained 460 based on the training set of content-based features 205 previously associated with their corresponding concepts—i.e., the content-based features extracted from the various concept training sets—using a learning algorithm such as AdaBoost. This training process is further described above with respect to the classifier training module 240. The accuracy of each trained content-based classifier 212A is then evaluated 465 using the validation sets previously associated with the corresponding concept for the classifier. That is, the scores produced by the trained content-based classifiers 212A indicate whether or not the video from which the score was derived represents the given category. The values of the scores, and the source of the videos from which the scores were derived (i.e., the positive or negative example sets), are used to determine estimated accuracies of their classifiers. For example, a score indicating that a video from the positive example set for a concept does represent that concept tends to show that the classifier producing the score is accurate, but if the video were from the negative example set, the same score would tend to show that the classifier is not accurate. Classifiers found to have sufficient accuracy are retained 470 as content-based classifiers 212A for their corresponding concepts, and classifiers found to lack sufficient accuracy are discarded (e.g., not marked as representing an accurate classifier). Thus, at the end of an iteration, some of the concepts 211 will have an associated retained content-based classifier 212A deemed to be sufficiently accurate, and some will not.

The retained content-based classifiers 212A are applied 480 to each of the videos 117 in the training or validation sets for any of the concepts 211 (or, more specifically, to the features 205 of the respective videos). This produces a set of scores for each video, one score per trained classifier. These scores are then added 485 (e.g., appended) to the existing features 205 for the videos and used in the learning at the next iteration.

At the end of each iteration, it is determined 490 whether a termination condition has been met, in which case the learning process terminates. At time of termination, the concepts that can be recognized are those for which a content-based classifier 212A was retained in the prior iterations as being sufficiently accurate. The remaining concepts lacking a classifier are unrecognizable—or (more specifically), not recognizable with the required threshold degree of accuracy. If no termination condition has been met, the learning process continues to the next iteration, returning to training step 460 and using the score features derived from the content-based classifiers 212A trained (or re-trained) during the prior iteration to learn additional classifiers. In one embodiment, a termination condition is met if some predetermined maximum number of iterations (e.g., 100) has occurred, and/or if no additional new content-based classifiers 212A, or fewer than some threshold desired number of new classifiers, were learned in the prior iteration.

The additional video features provided by the new classifier scores at a given iteration can be used in various ways to learn content-based classifiers 212A in the next iteration. In one embodiment, additional classifiers for concepts not already having a content-based classifiers 212 are trained using the additional features, but the previously-trained classifiers are not retrained. In another embodiment, the previously-trained content-based classifiers 212A are retrained using the additional score features, thereby tending to become more accurate, but classifiers are not trained for new concepts. In another embodiment, content-based classifiers 212A are trained for new concepts, and previously-learned classifiers are also retrained using the additional score features.

Note that constraints on the learning process permit accurate learning of classifiers based only on the scarce or potentially-inaccurate user-supplied metadata. Specifically, the purging of concepts that are too frequent or too infrequent, the evaluation of the trained content-based classifiers 212A on a previously unseen validation set after every iteration, and a requirement of high classifier accuracy (e.g., both high precision and high recall) work together to ensure that the inaccuracies of the user-supplied metadata are properly taken into account.

FIG. 4C is a flowchart illustrating the training of the text-based classifier 212B—or, more generally, the training of a second classifier type using a first classifier type—according to one embodiment. The content-based classifiers 212A (the first classifier type) are applied 491 to obtain a set of scores for each video, one score per concept for which a classifier of the first type has been trained. The scores are used to form 492 a second training set for the training of the second classifier type, with videos scoring highly for a particular concept being placed in the positive example set for the concept. Textual features (more generally, features of a second type) are then extracted 493 from the second training set by the feature extraction module 230, and the text-based classifier 212B (more generally, classifier of a second type) is trained 494 by the classifier training module 240, e.g., using maximum entropy or some other logistic regression algorithm.

Thus, by above-described process the classifier learning module 119 learns concepts that can be accurately recognized in a set of videos, as well as the classifiers 212 used to recognize them. Moreover, the process operates without the need for any set of concepts to be known a priori, and without the need for human experts to pre-apply or verify concept labels to the various videos. The accuracy of the concept recognition is further enhanced by combining the results of different types of classifiers, such as content-based classifiers and text-based classifiers, into a combined score.

Applications of Iterative Unsupervised Classifier Learning

The above-described process, and the combined classifier scores obtained therefrom, have a number of valuable applications.

Figure 5:
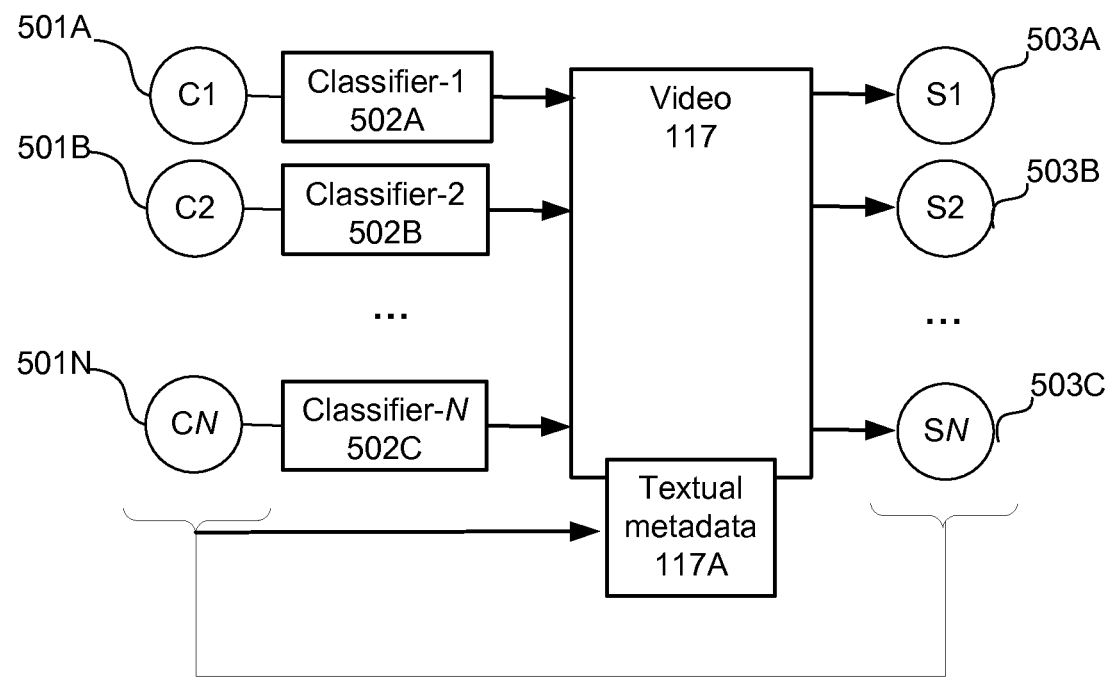
FIG. 5 is a data flow diagram depicting the use of the trained classifiers to augment metadata of a video, according to one embodiment.

1) Concept Labeling of Videos: As one example, the process can be used to add concept labels to videos having little or no user-supplied descriptive text. That is, the set of compound concept classifiers can be applied to each video 117 of the video repository 116. Then, in one embodiment, for each compound classifier for which the resulting score indicates that the video 117 represents the associated concept 211, the corresponding concept label 211A is added to the metadata of the video. For example, FIG. 5 depicts compound classifiers 502, each corresponding to a concept 501. The compound classifiers 502 are applied to one of the videos 117, each producing some score 503. For the scores 503 that indicate that the video 117 represents the associated concept 501, the labels 211A of the corresponding concepts 501 are then added to the text metadata 117A of the video, e.g., to the tags. In an alternative embodiment, the scores 503 are sorted, and only the labels 211A corresponding to the top N concepts 211 are added. In another alternative embodiment, only those scores 503 indicating a particularly strong match—i.e., only those scores above some particularly high threshold—are added.

2) Concept Representation for Video Browsing and Searching: Since, as previously noted, users frequently provide only very minimal textual description when uploading a video to a video hosting service, this additional information can prove extremely useful to users when searching for videos of relevance to them. For example, the user can perform an explicit query for videos, such as searching for videos having a particular concept 211, and the additional concept information derived for the various videos using the compound classifiers can help to identify videos representative of the concept. Similarly, a video hosting service using the concept data produced by the classifier learning module 119 could display some form of visual representation of the learned concepts, such as a hyperlink, a graphic, or a labeled option button, in a category-browsing user interface, e.g., on a web page associated with the video hosting service. A user could then click on a visual representation of the concept to see videos previously determined to represent that concept. To provide rapid user feedback, a video hosting service could periodically identify and cache the videos with the N highest combined scores for a given concept and then quickly display those videos in response to a user clicking on the visual indication corresponding to that concept. Or, the video hosting service could display the discovered concepts found to be associated with a given video and added to the video metadata in its standard user interface, and a user could scan the metadata associated with a currently-displayed video to determine whether it is worth viewing further.

3) Correction of Video Descriptions Based on Concept Identification: As another example application of the process, existing user-supplied textual metadata can be tested and—if found to be inaccurate—modified. This is of particular use for identifying and fixing "spam" video descriptions, where the user submitting the video intentionally provided a misleading description. More specifically, the user-supplied textual metadata for a video 117 is obtained. If the textual metadata includes a concept label 211A for which a compound classifier has been learned, the classifier is applied to the video, thereby producing a score. If the score indicates that the video does not represent the associated concept—e.g., the score is below some minimum threshold—then a remedial action can be taken, such as flagging the video, removing the associated text from the user-supplied metadata, and the like.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
   accessing a set of concepts derived from textual metadata of videos;
   accessing, for each of a plurality of the concepts, a corresponding content-based classifier that inputs content features of a video and outputs a score indicating a likelihood that the video represents the corresponding concept;
   obtaining a set of concept scores by applying, to content features of each video of a plurality of the videos, the content-based classifiers;
   identifying, for each concept of a plurality of the concepts, a training set comprising ones of the videos for which the obtained concept scores corresponding to the concept indicate at least a threshold level of likelihood that the videos represent the concept;
   deriving, from textual metadata of the videos of the identified training sets, textual features;
   training text-based classifiers for the plurality of the concepts, the text-based classifiers taking as input the textual features and outputting concept scores indicating a likelihood that the videos represent the corresponding concepts;
   after training the text-based classifiers, receiving a new video to which the text-based classifiers have not previously been applied;
   obtaining a first score for a first one of the concepts by applying the content-based classifier to the new video;
   obtaining a second score for the first concept by applying the text-based classifier to the new video;
   forming a combined score, the forming comprising forming a product of the first score and the second score; and
   determining whether the new video represents the first concept based on the combined score.

2. The computer-implemented method of claim 1, further comprising selecting, as the textual metadata for a video from which textual features are derived, a given maximum number of a set of most recent user comments on the video.

3. The computer-implemented method of claim 1, wherein deriving the textual features for a video comprises:
   identifying, for each word of some set of words, occurrences of the word in the video; and
   forming a vector representing the occurrences, each element of the vector corresponding to one of the words and representing the occurrences of the word.

4. A computer-readable storage medium storing executable computer program instructions, comprising:
   instructions for obtaining a set of concept scores by applying, to each video of a set of videos, a first classifier for a concept, the first classifier taking as input a first type of feature of the video and outputting a concept score indicating a likelihood that the video represents the concept;
   instructions for identifying ones of the videos for which the corresponding obtained concept score has at least a threshold value;
   instructions for deriving, from the identified ones of the videos, features of a second type different from the first type of features; and
   instructions for training a second classifier for the concept based on the second type of features, the second classifier taking as input the second type of features of a video and outputting a concept score indicating a likelihood that the video represents the corresponding concept, wherein the first classifier is one of a content-based classifier and a text-based classifier, and wherein the second classifier is one of a content-based classifier and a text-based classifier, the first classifier and the second classifier taking as input different types of features.

5. The computer-readable storage medium of claim 4, further comprising instructions for:

after training the second classifier, receiving a new video to which the second classifier has not previously been applied;

obtaining a first score for the concept by applying the first classifier to the new video;

obtaining a second score for the concept by applying the second classifier to the new video;

forming a combined score as a function of the first score and the second score; and determining whether the new video represents the first concept based on the combined score.

6. The computer-readable storage medium of claim 5, wherein forming the combined score comprises forming the product of the first score and the second score.

7. The computer-readable storage medium of claim 6, further comprising instructions for, prior to forming the product:

reducing the first score by some value representing a score of minimum reliability; and responsive to the reduced first score being less than 0.5, converting the reduced first score to 0.0.

8. The computer-readable storage medium of claim 4, further comprising instructions for selecting, as textual metadata for a video from which textual features are derived, a given maximum number of a set of most recent user comments on the video.

9. The computer-implemented method of claim 8, further comprising, prior to forming the product:

reducing the first score by some value representing a score of minimum reliability; and responsive to the reduced first score being less than 0.5, converting the reduced first score to 0.0.

10. The computer-readable storage medium of claim 4, further comprising instructions for deriving textual features for a video, comprising:

identifying, for each word of some set of words, occurrences of the word in the video; and forming a vector representing the occurrences, each element of the vector corresponding to one of the words and representing the occurrences of the word.

11. A computer system comprising:

a computer processor; and a computer-readable storage medium having executable computer program instructions embodied therein that when executed by the computer processor perform actions comprising:

accessing a set of concepts derived from textual metadata of videos;

accessing, for each of a plurality of the concepts, a corresponding content-based classifier that inputs content features of a video and outputs a score indicating a likelihood that the video represents the corresponding concept;

obtaining a set of concept scores by applying, to content features of each video of a plurality of the videos, the content-based classifiers;

identifying, for each concept of a plurality of the concepts, a training set comprising ones of the videos for which the obtained concept scores corresponding to the concept indicate at least a threshold level of likelihood that the videos represent the concept;

deriving, from textual metadata of the videos of the identified training sets, textual features;

training text-based classifiers for the plurality of the concepts, the text-based classifiers taking as input the textual features and outputting concept scores indicating a likelihood that the videos represent the corresponding concepts, after training the text-based classifiers, receiving a new video to which the text-based classifiers have not previously been applied;

obtaining a first score for a first one of the concepts by applying the content-based classifier to the new video;

obtaining a second score for the first concept by applying the text-based classifier to the new video;

forming a combined score, the forming comprising forming a product of the first score and the second score; and determining whether the new video represents the first concept based on the combined score.

12. The computer system of claim 11, the actions further comprising selecting, as the textual metadata for a video from which textual features are derived, a given maximum number of a set of most recent user comments on the video.

13. A computer-implemented method comprising:

accessing a set of concepts derived from textual metadata of videos;

identifying, for each of a plurality of the concepts, a first training set of videos based on a presence of the concept within textual metadata of the videos;

training one or more content-based classifiers for the concepts based on content of the videos in the training sets that correspond to the concepts;

obtaining a set of scores for each video of a plurality of the videos by applying the trained one or more content-based classifiers to content of the video, each score of the set of scores representing a likelihood that the video represents a corresponding one of the concepts;

identifying, for each of a plurality of the concepts, a second training set of videos based on ones of the scores that correspond to the concept;

selecting, as textual metadata for the videos in the training sets that correspond to the concepts, a given maximum number of a set of most recent user comments on the videos in the training sets that correspond to the concepts; and training one or more text-based classifiers for the concepts based on the selected textual metadata.

14. The computer-implemented method of claim 13, further comprising:

after training the classifiers, receiving a new video to which the classifiers have not previously been applied;

obtaining a first score for a first one of the concepts by applying the one or more content-based classifiers to the new video;

obtaining a second score for the first concept by applying the one or more text-based classifiers to the new video;

forming a combined score as a function of the first score and the second score; and determining whether the new video represents the first concept based on the combined score.

15. The computer-implemented method of claim 14, wherein forming the combined score comprises forming the product of the first score and the second score.

16. The computer-implemented method of claim 15, further comprising, prior to forming the product:
  reducing the first score by some value representing a score of minimum reliability; and
  responsive to the reduced first score being less than 0.5, converting the reduced first score to 0.0.

17. The computer system of claim 11, wherein deriving the textual features for a video comprises:
  identifying, for each word of some set of words, occurrences of the word in the video; and
  forming a vector representing the occurrences, each element of the vector corresponding to one of the words and representing the occurrences of the word.

\* \* \* \* \*